US007144321B2

(12) United States Patent
Mayeroff

(10) Patent No.: US 7,144,321 B2
(45) Date of Patent: Dec. 5, 2006

(54) ELECTRONIC GAME APPARATUS AND METHOD PROVIDING A SECONDARY GAME TRIGGERED APART FROM A PRIMARY GAME

(75) Inventor: Jason M. Mayeroff, Bangkok (TH)

(73) Assignee: IGT, Reno, NV (US)

( * ) Notice: Subject to any disclaimer, the term of this patent is extended or adjusted under 35 U.S.C. 154(b) by 0 days.

(21) Appl. No.: 10/753,906

(22) Filed: Jan. 7, 2004

(65) Prior Publication Data

US 2005/0148383 A1 Jul. 7, 2005

(51) Int. Cl.
*A63F 13/00* (2006.01)

(52) U.S. Cl. ........................................................ 463/16

(58) Field of Classification Search ............ 463/16–22, 463/25–27, 30–31; 273/138.1, 138.2, 139, 273/143 R, 242–293

See application file for complete search history.

(56) References Cited

U.S. PATENT DOCUMENTS

| | | | | |
|---|---|---|---|---|
| 5,655,961 | A | 8/1997 | Acres et al. | |
| 5,702,304 | A | 12/1997 | Acres et al. | |
| 5,741,183 | A | 4/1998 | Acres et al. | |
| 5,752,882 | A | 5/1998 | Acres et al. | |
| 5,788,573 | A | 8/1998 | Baerlocher et al. | |
| 5,820,459 | A | 10/1998 | Acres et al. | |
| 5,823,874 | A | 10/1998 | Adams | |
| 5,836,817 | A | 11/1998 | Acres et al. | |
| 5,848,932 | A | 12/1998 | Adams | |
| 5,876,284 | A | 3/1999 | Acres et al. | |
| 5,882,261 | A | 3/1999 | Adams | |
| 5,911,418 | A | 6/1999 | Adams | |
| 5,947,820 | A | 9/1999 | Morro et al. | |
| 6,089,978 | A | 7/2000 | Adams | |
| 6,159,098 | A * | 12/2000 | Slomiany et al. | 463/25 |
| 6,162,121 | A | 12/2000 | Morro et al. | |
| 6,162,122 | A | 12/2000 | Acres et al. | |
| 6,168,520 | B1 | 1/2001 | Baerlocher et al. | |
| 6,224,482 | B1 * | 5/2001 | Bennett | 463/20 |
| 6,309,300 | B1 * | 10/2001 | Glavich | 463/26 |
| 6,334,814 | B1 | 1/2002 | Adams | |
| 6,364,768 | B1 | 4/2002 | Acres et al. | |
| 6,371,852 | B1 | 4/2002 | Acres | |
| 6,375,567 | B1 | 4/2002 | Acres | |
| 6,375,569 | B1 | 4/2002 | Acres | |
| 6,386,974 | B1 | 5/2002 | Adams | |
| 6,565,434 | B1 | 5/2003 | Acres | |
| 6,605,000 | B1 | 8/2003 | Adams | |
| 6,663,448 | B1 | 12/2003 | Davies et al. | |
| 6,663,485 | B1 | 12/2003 | Niermann | |
| 6,663,488 | B1 | 12/2003 | Adams | |
| 6,722,976 | B1 | 4/2004 | Adams | |
| 6,793,577 | B1 | 9/2004 | Wilkins et al. | |
| 6,827,646 | B1 | 12/2004 | Adams | |
| D503,951 | S | 4/2005 | Karstens | |

(Continued)

FOREIGN PATENT DOCUMENTS

| | | | |
|---|---|---|---|
| GB | 2 201 821 | A | 9/1988 |

(Continued)

*Primary Examiner*—Kim Nguyen
(74) *Attorney, Agent, or Firm*—Bell Boyd & Lloyd LLC

(57) ABSTRACT

A gaming device and method where there is a primary game and a bonus game. The player makes a wager and plays the primary game to obtain an outcome. Before, during or after the primary game a bonus game is played, apart from the primary game, which can trigger an separate, unrelated award. A bonus award display displays any award from the bonus game.

14 Claims, 4 Drawing Sheets

U.S. PATENT DOCUMENTS

| | | | |
|---|---|---|---|
| 6,890,255 | B1 | 5/2005 | Jarvis et al. |
| 2001/0003709 | A1 | 6/2001 | Adams |
| 2001/0018361 | A1 | 8/2001 | Acres |
| 2002/0052234 | A1 | 5/2002 | Adams |
| 2002/0142826 | A1 | 10/2002 | Adams |
| 2002/0142830 | A1 | 10/2002 | Adams |
| 2002/0198038 | A1 | 12/2002 | Adams |
| 2003/0013520 | A1 | 1/2003 | Adams |
| 2003/0060272 | A1 | 3/2003 | Glavich et al. |
| 2003/0087689 | A1 | 5/2003 | Adams |
| 2003/0114216 | A1 | 6/2003 | Adams |
| 2004/0002372 | A1 | 1/2004 | Rodgers et al. |
| 2004/0038728 | A1 | 2/2004 | Adams |
| 2004/0038734 | A1 | 2/2004 | Adams |
| 2004/0051240 | A1 | 3/2004 | Adams |
| 2004/0053660 | A1 | 3/2004 | Webb et al. |
| 2004/0077403 | A1 * | 4/2004 | Maya et al. .................. 463/20 |
| 2004/0248640 | A1 | 12/2004 | Kaminkow et al. |
| 2005/0026671 | A1 | 2/2005 | Baerlocher |
| 2005/0026673 | A1 | 2/2005 | Paulsen et al. |
| 2005/0026678 | A1 * | 2/2005 | Kaminkow .................. 463/20 |

FOREIGN PATENT DOCUMENTS

| | | |
|---|---|---|
| WO | WO 2000 32286 | 6/2000 |

* cited by examiner

ELECTRONIC GAME APPARATUS AND METHOD PROVIDING A SECONDARY GAME TRIGGERED APART FROM A PRIMARY GAME

FIELD OF THE INVENTION

The present invention relates to electronic gaming devices and methods and more particularly to devices and more particularly to gaming devices and methods having a primary game and a secondary game.

BACKGROUND

Gaming devices with additional awards, typically characterized as bonus or secondary awards, are well known in the gaming industry. One form may be as simple as a progressive award for certain outcomes from a primary game. A "progressive" system is one where a portion of wagers from one or many gaming machines are used to fund a jackpot which is paid out when the player has made the required wager, usually the maximum wager, and obtains the required game outcome. Progressives have been applied to slot machines, video Poker machines and other games, including table games.

Another form of gaming device is one where there is a bonus or secondary game (hereinafter referred to as "bonus" games) or feature which is triggered by one or several outcomes during play of a primary game and which is used to select or display a pre-selected secondary award. One such device is described in U.S. Pat. No. 5,848,932 issued December 1998 to Adams and titled "Method of Playing Game and Gaming Games With An Additional Payout Indicator". In this game, when the player obtains a predetermined, "triggering" outcome in the primary or base game, a bonus game or game opportunity is launched. For example, a bonus wheel or bonus wheel display may be provided which, when prompted, spins to display a secondary award to the player.

Other triggered bonus games include those where the player is provided with bonus selections which, when picked by the player, reveal the award(s) for the bonus feature for the game.

In designing bonus games, gaming designers must calculate the frequency at which the bonus game trigger(s) will be obtained in the base game and, based upon the play of the bonus game, the contribution to the overall payback of the game. That is, if a gaming designer wants a game to have a 92% payback (i.e. theoretically retain 8% of all wagers) the payback contribution from the base game and bonus game must be configured to account for the contribution from the bonus game feature. Another factor which must be considered in the game design calculus is whether or not large awards will be offered in the bonus game feature. It is believed that by providing large awards in the bonus game feature is attractive to players. However, if the bonus game feature contribution to the game overall payback is too high, the payback from the base game must be reduced. Reducing the pay back for the base game can be frustrating to the player who does not obtain a bonus game trigger since the player will tend to lose his/her bankroll in short order. If the payback from the base game is to be maintained high (so the player maintains interest in the game), then the frequency at which the secondary game feature is triggered must be reduced. As stated above, if the frequency of obtaining the trigger is low, the player is likely to terminate their gaming session early since he/she has not obtained a triggering outcome. Thus, the game designer is left with decisions and trade-offs in designing the game. Games where the secondary or bonus feature has high awards, requires either reducing the frequency of the trigger for the secondary game or lowering the payback for the base game. If the bonus game is infrequently triggered and the base game has a low payback, a player will lose enthusiasm for the game or run out of money before the bonus game is triggered. In such a circumstance it is likely that the player will not play the game again. Making the secondary game awards small but frequently triggered can lead to a boring game where the bonus game trigger becomes a routine event.

A further drawback is the marrying of the bonus game to a trigger in the base game mandates the trade-offs and compromises set forth above which, in turn, limits the degree of creativity which the gaming designer can utilize in designing a game.

There is a need for a game which can provide a bonus game which is not driven by or triggered from a base game.

There is a need for a game wherein the bonus game can be configured to provide any desired contribution to the game without consideration to the frequency of the player obtaining a base game trigger.

SUMMARY OF THE INVENTION

There is set forth according to the present invention a device and method which overcomes the drawbacks noted above.

Toward this end there is set forth a method and device which includes a computer processor and a primary game display. The primary game display may be embodied as a window to view electro-mechanical reels of a slot machine or a video display displaying the features of the base game such as the virtual reels of a video slot machine. Apparatus is provided for a player to make a wager to play the apparatus and to prompt play. The processor is configured to, in response to prompting of play, randomly select and display indicia at the primary game display to define a primary game winning or losing outcome and if the primary game outcome is a winning outcome to issue a primary game award to the player. For example, the processor may be configured to randomly select and outcome and control the display (or electro-mechanical reels) to display the reels spinning and stopping to align symbols on one or more pay lines for the game. If the indicia aligned on any pay line is a winning combination, an award is issued for the combination.

The processor is further configured to, when prompted, randomly select, independent of the primary game outcome, between a bonus game trigger or no trigger condition. That is, whether or not the secondary or bonus game is triggered is not determined by the selection of base game symbols. The selection of the bonus game trigger may be confined to the processor and such that the player does not know if the bonus game trigger is selected until the bonus feature is launched. Alternatively, there may be a separate display or feature which is controlled by the processor to display to the player a feature representing the selection process such as a separate slot machine display or other display. It should be emphasized that the selection of the bonus game trigger condition is completely independent of the outcome of the base game, however the random selection process is started by play of the primary or base game.

Once the bonus game has been triggered, a secondary game display is provided for displaying the award(s) provided at the primary game display or a separate display. As but an example, once the secondary game is triggered, a wheel or other display may be provided to display the available, secondary game awards and the selection thereof. The award from the secondary game is awarded to the player.

The device and method of the present invention permits the game designer to design the base or primary game without regard to inclusion of the frequency at which a secondary game trigger is obtained in the primary game. For example, if the designer wants a game having an overall pay back percentage of 92% to the player, the designer need only design the base game pay back percentage, e.g. 85%, and the secondary game (frequency of trigger and awards) at 7% to get the overall pay back percentage to the desired levels. For example, if the designer wants to have frequent secondary (bonus) game events, he/she can select a frequency of the trigger at one in ten and adjust the secondary awards appropriately. If the designer wants to provide large secondary game awards, he/she can configure the game to issue the large secondary award infrequently by providing, for example, more frequent small bonus awards or "no bonus award" outcomes or can reduce the frequency at which the bonus game. The foregoing provides the game designer with more options in designing games which will attract and keep players.

A further feature is that by "untying" the bonus game trigger from the primary game, the gaming designer is free to adopt new and clever themes and schemes for displaying the triggering of the bonus game and the presentation of the award.

BRIEF DESCRIPTION OF THE DRAWINGS

These and other features of the present invention will become better understood with reference to the description, claims and drawings wherein:

DESCRIPTION

Figure 1:
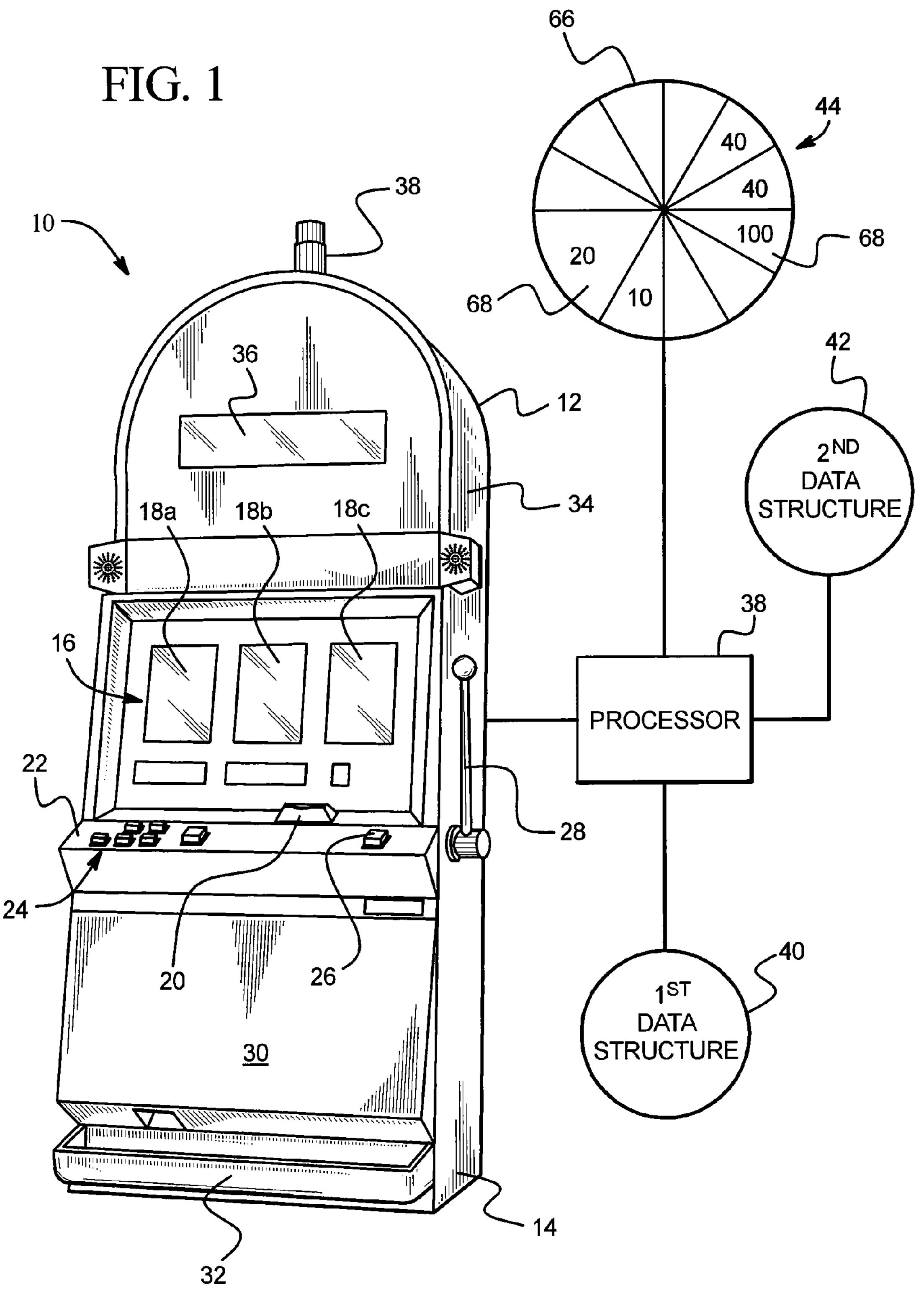
FIG. 1 is illustrates features of the device and method.

Turning to the drawings, FIG. 1 shows a device 10 and method according to the present invention. The device 10 includes a primary game apparatus 12 configured for the play of the primary or base game. For this purpose the primary game apparatus 12 includes a housing 14 which supports a primary game display 16 of a type as is known in the art. The primary game display 16 may consist of, as shown, three windows 18*a–c* each providing a view of electromechanical reels (not shown). As is known in the art, each reel includes indicia, i.e. reel symbols. The reels spin to ultimately position indicia in the windows 18*a–c* along one or more predefined pay lines to define the outcome for the primary game.

For a player to input a wager, the apparatus 12 includes a coin/token acceptor 20 as is known in the art. Other means may be provided for the player to input a wager such as a cash or script validator, debit or credit card reader or the like, as is known in the art. For purposes of the following description it shall be assumed that the primary game apparatus 12 is a three coin game accepting up to a maximum of three coins for each spin.

Disposed below the primary game display 16 is a panel 22 mounting control buttons 24, the function of which are well known in the art. One button 26 is configured for prompting play of the primary game apparatus 12 and device 10. Alternatively a handle 28 which may be pulled by the player to prompt play.

Below the panel 22 is the backlit belly glass 30 which may include graphics to identify the game and attract players.

At the bottom of the primary gaming apparatus 12 is a coin tray 32 to receive coins dispensed by the primary game apparatus 12 to the player. In lieu of or in addition to dispensing coins, the primary game apparatus may be configured to include a script ticket writer to write a voucher ticket in the amount of the cash to be dispensed to the player. Ticket reader's and writers are well known in the art.

Located above the primary game display 16 is the top box 34 that may include a progressive jackpot display 36. A candle 38 at the top of the primary game apparatus 12 provides a signal light for service for the device 10 or the occurrence of a jackpot or the player.

According to the present invention, the device 10 includes a computer processor 38 configured to operate and control the various functions of the device 10. The processor 38 is housed within the housing 14 and communicates with first and second data structures 40, 42 as hereinafter described. The processor 38 also communicates with a bonus game display 44 which may be embodied as a electro-mechanical wheel, slot machine reels, video display or other displays for the bonus game feature. Where the bonus game display 44 is a separate wheel as suggested in FIG. 1, it may be mounted on or in the primary game apparatus 12 top box 34 and may be an electro-mechanical wheel or a graphic video display of the wheel. Further, the bonus game display 44 and primary game display 16 may share the same display. That is, where the primary game display 16 is a video display, the processor 38, when the bonus game is triggered as hereinafter described, is controlled to segue to display to the player the bonus game display.

Figure 2:
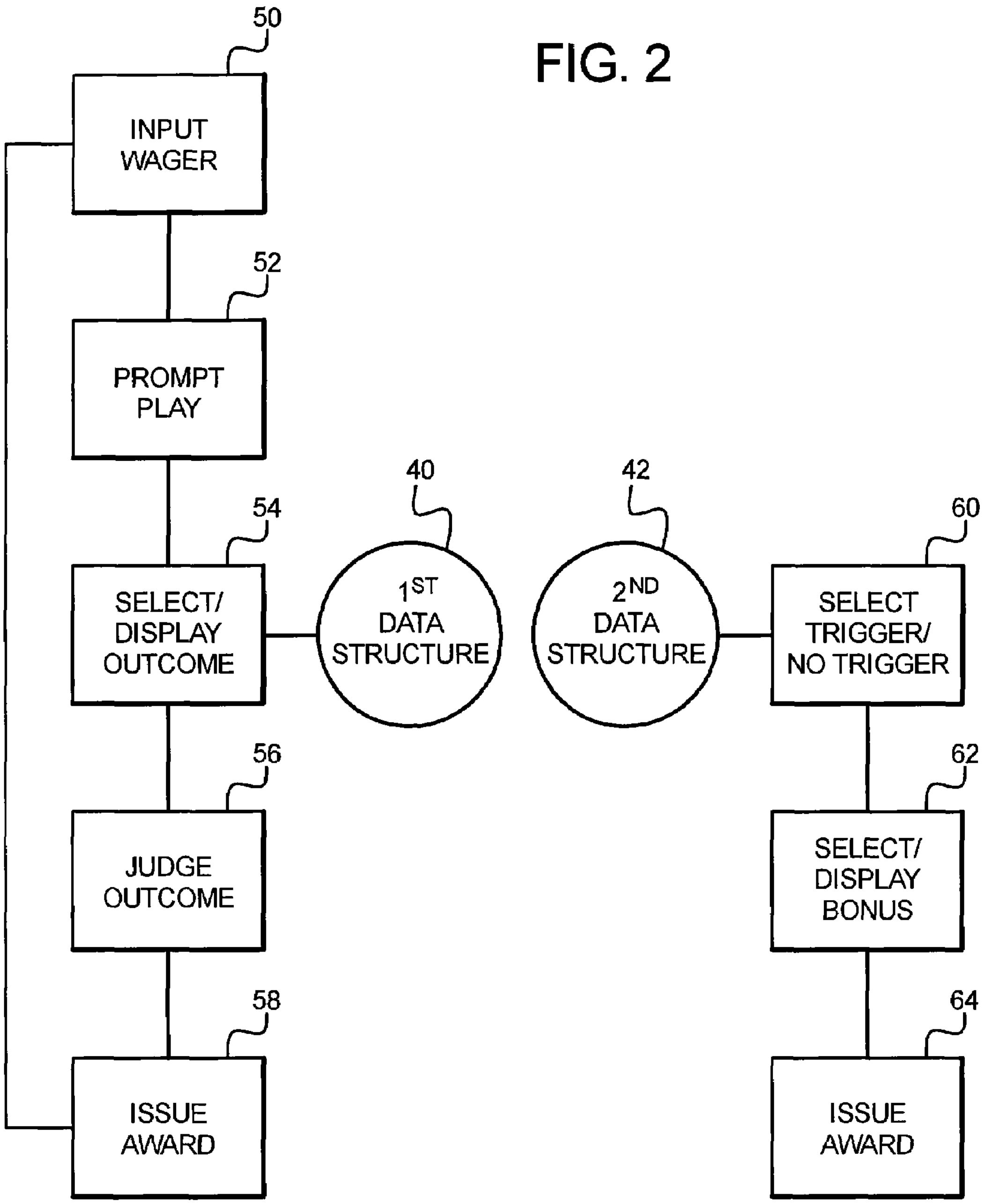
FIG. 2 is a logic diagram illustrating the operation of an embodiment of the present invention.

Turning to FIG. 2, the play of the device 10 according to the present invention will now be described. To play the device 10 and method of the present invention, the player inputs their wager at 50. The wager may be placed, depending upon the configuration of the primary game apparatus, by inserting coins or tokens into the coin acceptor 20, by inserting cash into a cash validator, by wagering accumulated gaming credits, by using a credit or debit instrument or by inserting script into a script reader, all of which are known in the art. Where the device 10 is a novelty device, such as a hand held toy or computer game incorporating the features of the present invention, the player may wager fictitious credits for fun. The player may wager a minimum wager of one unit (one coin) to the maximum accepted by the primary game apparatus 12, e.g. 3 units. After the wager has been made, the player at 52 prompts play of the primary game apparatus 12 by, for example, depressing a spin button 26 or pulling the handle 28.

In response to prompting play at 52, the processor 38 at 54 randomly selects and controls the primary game display 16 to display the outcome for the primary game. As shown in FIG. 1, the processor 38 may select the outcome by using known means such as slot machine reel virtual mapping as disclosed in Telnaes, U.S. Pat. No. 4,448,419, the disclosure of which is incorporated by reference. According to this reference, the processor 38 selects a reel stop position for each reel from a virtual map stored, for example, in the first data structure 40. The map, in essence, maps data corresponding to a reel symbol (or blank) to a reel stop position for the reel. Where a reel is an electromechanical reel having twenty-two stop physical stop positions, data corresponding to twenty-three or more virtual symbols may be mapped to stop positions to give the reel, virtually, more stops. The processor 38, using a suitable random number generator, selects numbers, e.g. data addresses, finds the corresponding stop position and then controls the reel spinning stepper motors (not shown) for each reel to rotate the reels and stop them at the mapped reel stop to define the outcome. By configuring the distribution of the reel sets indicia, winning outcome combinations and award for each winning outcome, the game designer can set the pay back for the primary game apparatus at the desired level. As an example, the designer will configure the map and winning combinations such that each winning combination has a statistically ascertainable chance of occurring. A jackpot award may be statistically expected every 5 million spins whereas an award of 3 units (even money return on the wager) may be expected every five spins. By summing the products of the statistical frequency for each winning outcome and the award therefore, the overall pay back for the machine can be determined. That is, the overall pay back may be expressed as:

Base Game Pay Back=Σ(frequency)×(award)

The foregoing features of the base or primary game are well known.

Regarding the overall payback percentage, many gaming-jurisdictions have certain minimum standards for payback percentage for gaming devices to make the games fair for the players.

Continuing with FIG. 2, after selection of the outcome, the processor 38 displays at the primary game display 16 the selected outcome. Where the primary game is an electromechanical, three reel slot machine (often referred to as a “stepper game”), the processor 38 controls the reels to rotate and stop to display the outcome at the primary game display 16 where symbols or blanks (referred to collectively herein as indicia) are displayed on one or more designated pay lines, again as is known in the art. At 56 the processor 38 judges whether the outcome is a winning outcome or a losing outcome. If the outcome is a winning outcome, the processor 38 at 58 awards the corresponding award to the player by dispensing coins/tokens into the tray 32 or awarding gaming credits which are accumulated in a credit meter.

According to the present invention, the prompting of play of the primary game at 52 also prompts the processor 38 to randomly select between a trigger or a no trigger condition at 60. For this feature, the processor 38 second data structure 42 may be provided with a map (as discussed above) which includes data corresponding to a bonus game trigger (and the award won) or a no trigger condition. That is, the second data structure may be provided with a map having the following configuration:

| Address | Result |
|---|---|
| 1 | No bonus trigger |
| ↓ | |
| 100 | " |
| 101 | 10 units (Bonus triggered) |
| 102 | 100 units (Bonus triggered) |
| 103 | No bonus trigger |

-continued

| Address | Result |
|---|---|
| ↓ | |
| 150 | " |
| . | . |
| . | . |
| . | . |

The map may include thousands of addresses depending upon the factors of the frequency at which the game designer wants the bonus game to be triggered, the awards offered by the bonus game and the desired contribution of the bonus game to the overall pay back for the device 10. For example, if the designer wants to offer large bonus awards and have the bonus triggered frequently but wants the bonus game to contribute only a small percentage to the overall pay back for the device 10 (so that the player receives greater or more frequent pays from the primary game), the designer needs to have the bonus game award small or no amounts more frequently and issue the large bonus game award in rare circumstances, e.g. one every several thousand bonus game triggers.

The contribution from the bonus game may be similarly expressed as:

Bonus contribution=Σ(frequency of each award)×(award)

Thus the overall pay back for the device 10 including the bonus contribution can be expressed as:

Overall Pay back=Base Game Pay Back+Bonus Contribution

As can be appreciated, the game designer has the variables of configuring the base game to have a desired pay back and can then design the bonus game to provide the desired contribution by varying the frequency of the bonus game trigger (without regard to requiring the bonus to be triggered by a combination of base game symbols in the base game), the frequency of award winning bonus game outcomes and the award for each.

Continuing with FIG. 2, at 62 the processor 38 displays the selected bonus game selection at the primary game display 16 or at a bonus game display 44. The bonus game display 44 may be a wheel, as shown in FIG. 2 or any other suitable bonus game display as hereinafter described.

If the bonus game trigger corresponds to a bonus game award, at 64 the processor 38 issues the award to the player by known means such as dispensing coins, issuing game credits or the like.

As shown in FIG. 1 the bonus game display 44 is embodied as a wheel 66 divided into sectors 68, each including an award (or no award) display. To display the bonus award, the wheel 66 is controlled by the processor 38 to rotate and position the sector 68 at an indicator (not shown) to display the bonus award won.

Figure 3A:
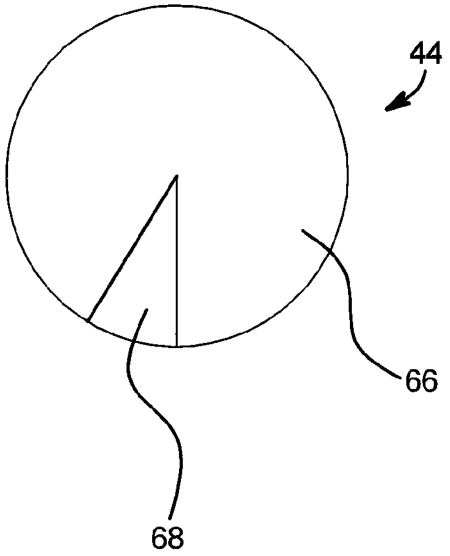
FIGS. 3A and B show one embodiment of the secondary, bonus game display.

Turning to FIGS. 3A and B, the features of the bonus game display 44 are shown. FIG. 3A illustrates the bonus game display 44 as a wheel 66 which is divided into sectors 68, only one of which is shown. Each sector 68 may include a bonus award as by a backlit panel or printing. In one embodiment the wheel 66 is controlled by the processor 38 to rotate to position the selected bonus award amount sector 68 at an indicator such as a pointer, light or other indicator. When a trigger condition is selected, the processor 38 controls the wheel 66 to rotate and stop to show the award won to the player.

In regards to the selection of the award amount, as described above when the trigger condition is selected the selected condition data may include the award amount. In an alternative embodiment, the selection of the award amount may be selected independently of the trigger condition. In this embodiment, once the trigger condition is selected the processor 38 executes another routine to randomly select the award and therefrom control the bonus game display 44, e.g. the wheel 66, to display the selected award.

Figure 3B:
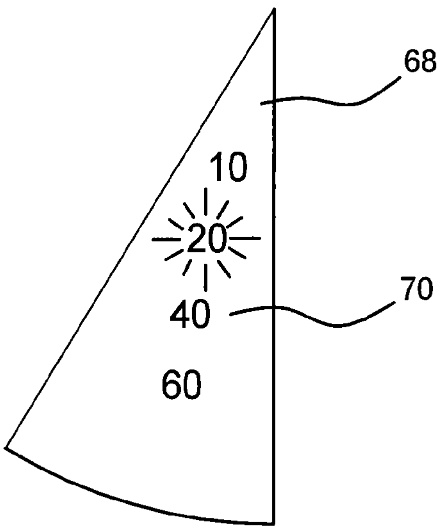

With reference to FIG. 3B, the wheel 68 may be configured to include in each sector 68 a sub-display 70 configured to display any one of a plurality of awards. As shown, the sector 68 includes a sub-display 70 to display awards of ten, twenty, forty or sixty units. This feature provides in one embodiment, where the wheel 66 is rotated, the ability to rotate the wheel 66 to a sector 68 having a group of awards and control the sub-display 70 to display the award.

In another embodiment, the wheel 66 may be stationary. The processor 38 controls the bonus game display 44 to display different awards in different sub-displays for the sectors 68 in a sequence and eventually display the bonus award won by the player.

Figure 4:
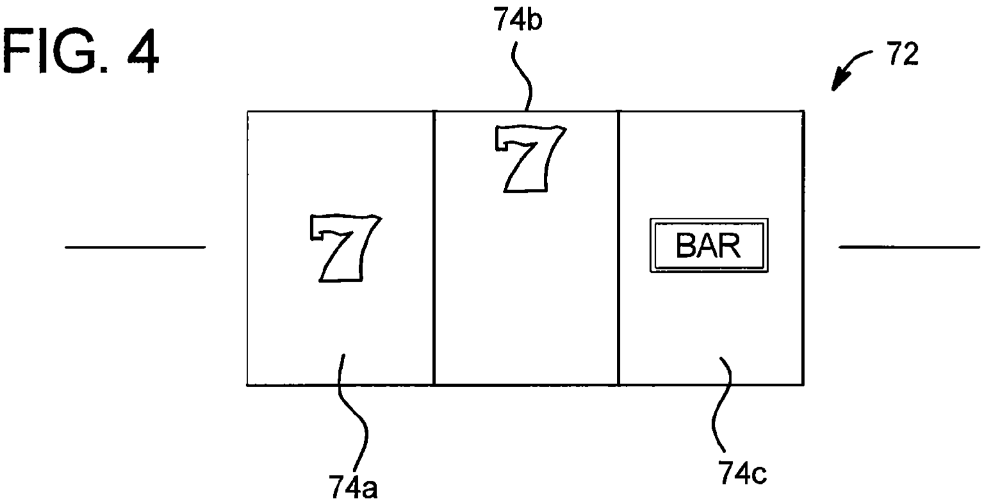
FIG. 4 shows another embodiment of a secondary bonus display.

With reference to FIG. 4 another form of the bonus game display 44 is illustrated as a separate slot machine display 72. This display 72 may display three reels 74*a–c*. When a bonus is triggered, the processor 38 controls the display 72 to display the reels 74*a–c* rotating to ultimately display an outcome. The operation and control of the slot machine display 72 may be as described above in connection with the primary game. The mapping of the slot machine display 72 may be such that each trigger event results in some bonus award to the player. Alternatively the mapping may be such that certain outcomes will result in no bonus award. In one embodiment, the slot machine display 72 may be controlled to produce a bonus award winning or losing outcome for each spin or game of the primary game. The mapping for the bonus game display 44 slot machine display 72 is configured to provide the desired contribution to the overall device 10 pay back.

Figure 5:
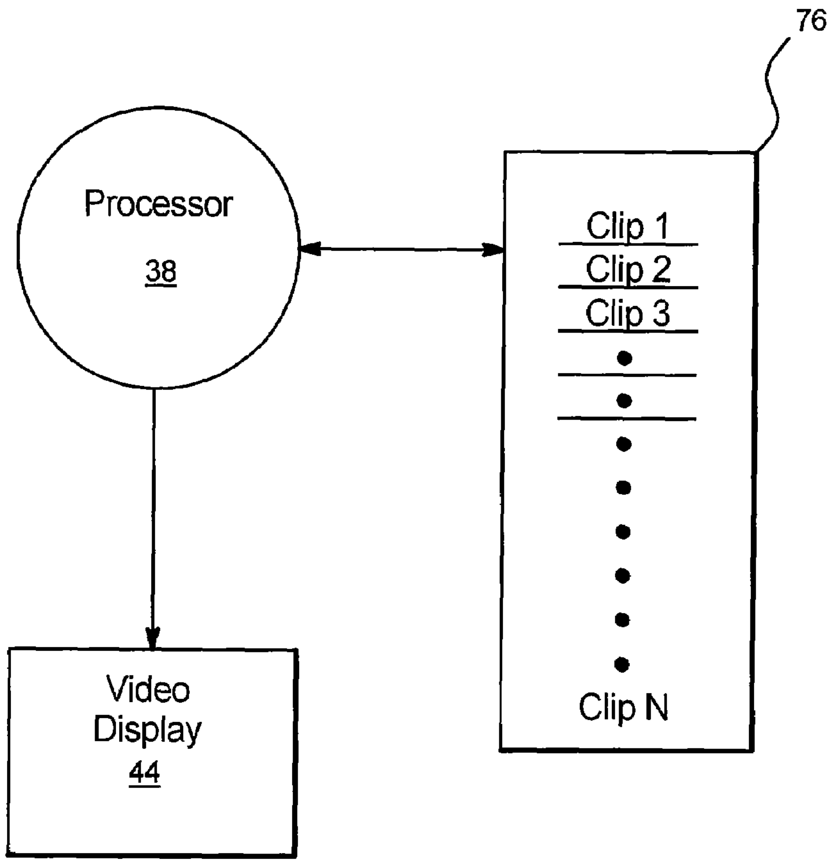
FIG. 5 shows another embodiment of the bonus game feature.

Other types of bonus game displays 44 may be used. With reference to FIG. 5, the processor 38 may be provided with a library 76 of bonus award video clips or animated presentations (Clips 1–N) to be displayed at a video bonus game display 44. When the bonus is triggered, the processor 38 refers to the library to select and display an entertaining video or animation clip and calls up the same to display the clip and award the bonus. For example, live footage of sporting events such as football plays, boxing events or the like may be displayed in conjunction with the issuance of the bonus.

As can be appreciated, the method and device 10 of the present invention "unties" the bonus game from the primary game. What is meant is that the bonus game can be triggered regardless of the outcome of the primary game. This provides several advantages. One advantage is that the game designer can design the primary and bonus game separately and then sum their contributions to obtain the desired overall payback for the device. Thus, where the primary game has been approved by gaming authorities, it is believed that approval of the overall device (with the bonus game) will be streamlined.

Another advantage is that bonus games can be added to any gaming device such as slot machines, Keno machines, video Poker machines or the like. For example, where an electronic Keno game has an 80% pay back, the overall pay back can be increased by adding a configured bonus game. In adding the bonus game feature of the present invention, the primary game need not be re-configured to include in the primary game, bonus game triggers.

As yet another feature, the bonus games can be created to have creative themes and presentations.

From a player's perspective, the present invention provides a bonus to the player regardless of the outcome from the primary game. In prior art games requiring a primary game trigger, the player watching the primary game outcome knows early in the presentation of the game outcome whether a bonus will be triggered. For example, some prior art game require three or more trigger symbols to appear in certain positions in the primary game display. With this requirement, the player knows during the spinning and stopping of the reels if a bonus will be triggered many times before the all of the reels have stopped. The failure to obtain a qualifying, triggering, outcome over many plays of the primary game can be frustrating to the player who may sense the game is too much in favor of the casino. Further a degree of frustration will be built up if the player gets two symbols but not the third. The player in that circumstance may feel that they are being teased and stop play of the game.

While I have shown and described certain embodiments of the present invention it should be understood that the invention is subject to many modifications. For example, the bonus game may be controlled by a separate processor which controls selection of the trigger, award and presentation. A further variation is to provide a bonus game progressive jackpot which is funded from one or more linked devices 10. As yet another variation, the bonus game may be funded by the primary game wager or the bonus game may require a separate wager. For example, the player may wager three units to play the primary game and an additional one unit to participate in the bonus game.

I claim:

1. An electronic gaming apparatus comprising:

a processor;

a primary game display;

a plurality of primary game outcomes, said primary game outcomes including a plurality of primary game losing outcomes and a plurality of primary game winning outcomes, each primary game winning outcome associated with a primary game award and having a probability of being selected in a play of the primary game, wherein said primary game awards and said probabilities form a primary game payback percentage;

means for a player to make a wager to play the apparatus and to prompt play;

said processor configured to, in response to the prompting of play, (i) randomly select and display indicia at the primary game display to define one of the primary game winning outcomes or one of the primary game losing outcomes, (ii) if the primary game outcome is one of the primary game winning outcomes, issue to the player the a primary game award associated with the displayed primary game winning outcome, and (iii) randomly select, independent of the primary game outcome, between a secondary game trigger or no trigger condition, such that the frequency with which a secondary game is triggered is independent of the primary game payback percentage, constant and predetermined with the prompting of each play;

a mechanical secondary game display having a display of a plurality of secondary game awards available to the player for a secondary game, each secondary game award having a probability of being selected, wherein said secondary game awards and said probabilities form an independent secondary game payback percentage, said secondary game awards are displayed prior to the selection of said secondary game trigger condition, said display of the secondary game awards is rotatable relative to said secondary game display, and said secondary game display is physically separate from said primary game display; and said processor configured to, in response to the selection of the secondary game trigger condition, control said secondary game display of the secondary game awards for relative rotation to identify a selection of at least one of said displayed secondary game awards, and award the selected secondary game award to the player.

2. The apparatus of claim 1 wherein said display of secondary game awards includes a wheel to display the secondary game awards, said wheel rotatable to select a displayed secondary game award.

3. The apparatus of claim 2 wherein said wheel includes segments each displaying a secondary award.

4. The apparatus of claim 1, which includes a separate display, controlled by the processor, to display the selection between the secondary game trigger or no trigger condition.

5. The apparatus of claim 1, wherein the primary game payback percentage and the secondary game payback percentage form an overall payback percentage.

6. An electronic gaming apparatus comprising:

a processor;

a primary game display;

means for a player to make a wager to play the apparatus and to prompt play;

said processor configured to, in response to the prompting of play, (i) randomly select and display indicia at the primary game display to define a primary game winning or losing outcome, (ii) if the primary game outcome is a winning outcome, issue a primary game award to the player, and (iii) randomly select, independent of the primary game outcome, between a secondary game trigger or no trigger condition, wherein each secondary game trigger is associated with a secondary game award;

a mechanical secondary game display having a display of a plurality of secondary game awards available to the player for a secondary game and an indicator wherein said secondary game awards are displayed prior to the selection of said secondary game trigger condition, at least one of said display of secondary game awards and said indicator relatively rotatable with respect to the other, said secondary game display physically separate from said primary game display;

said processor configured to, in response to the selection of the secondary game trigger condition, control said display of secondary game awards and said indicator for relative rotation, the alignment of said indicator and said display of secondary game awards identifying the selection of the displayed secondary game award associated with the selected secondary game trigger, and award the selected secondary game award to the player.

7. The apparatus of claim 6 wherein said display of secondary game awards includes a wheel, at least one of said wheel and said indicator moveable relative to the other to select a displayed secondary game award.

8. The apparatus of claim 7 wherein said wheel includes segments each displaying a secondary award.

9. The apparatus of claim 6, which includes a separate display, controlled by the processor, to display the selection between the secondary game trigger or no trigger condition.

10. An electronic gaming apparatus, comprising:

a processor;

a primary display communicating with said processor, said primary display controlled by said processor to display a primary game;

a plurality of primary game outcomes, said primary game outcomes including a plurality of primary game losing outcomes and a plurality of primary game winning outcomes, each primary game winning outcome associated with a primary game award and having a probability of being selected in a play of the primary game, wherein said primary game awards and said probabilities form a primary game payback percentage;

means for receiving a wager from a player communicating with said processor;

means for the player to prompt play of said primary game communicating with said data processor such that in response to the receipt of the wager and the player prompting play, the processor conducts said primary game by:

(a) randomly selecting and displaying indicia at the primary game display to define one of the primary game winning outcomes or one of the primary game losing outcome;

(b) if said primary game outcome is one of the primary game winning outcomes, issuing to the player the primary game award associated with the displayed primary game winning outcome, and (c) if the wager is at least a designated wager amount, randomly selecting, independent of said primary game outcome, independent of the primary game payback percentage and independent of the size of said wager, between a secondary game trigger or no trigger condition; and a secondary display physically separate from said primary display communicating with said processor, said secondary display including a mechanical wheel displaying a plurality of secondary game awards prior to the selection of said secondary game trigger condition and an indicator to select at least one of said secondary game awards, each secondary game award having a probability of being selected, wherein said secondary game awards and said probabilities form an independent secondary game payback percentage, at least one of said mechanical wheel and said indicator is rotatable with respect to the other by said processor in response to the selection of a secondary game trigger condition such that the positions of said mechanical wheel and said indicator randomly selects a secondary game award, said processor issuing said selected secondary game award to said player.

11. The apparatus of claim 10, which includes a separate display, controlled by the processor, to display the selection between the secondary game trigger or no trigger condition.

12. The apparatus of claim 10, wherein the primary game payback percentage and the secondary game payback percentage form an overall payback percentage.

13. A gaming device operable under control of a processor, said gaming device comprising:

a primary game operable upon a player placing a wager;

a plurality of primary game outcomes, said primary game outcomes including a plurality of primary game losing outcomes and a plurality of primary game winning outcomes, each primary game winning outcome associated with a primary game award and having a probability of being selected in a play of the primary game, wherein said primary game awards and said probabilities form a primary game payback percentage a primary game display device operable with said processor; and a secondary game having a mechanical secondary game display device including a plurality of displayed secondary game awards and an indicator, each secondary game award having a probability of being selected, wherein said secondary game awards and said probabilities form an independent secondary game payback percentage, said secondary game display is physically separate from said primary game display device and at least one of said secondary game awards and said indicator are rotatable relative to the other;

wherein the processor is programmed to:

(a) randomly select and display indicia at the primary game display device to define one of the primary game winning outcomes or one of the primary game losing outcomes;

(b) if the primary game outcome is one of the primary game winning outcomes, issue to the player the primary game award associated with the displayed primary game winning outcome;

(c) if the wager is at least a designated wager amount, randomly select, independent of the primary game outcome, between a secondary game trigger or no trigger condition, wherein said selection between the secondary game trigger and no trigger condition is independent of the primary game payback percentage and each secondary game trigger is associated with one of the secondary game awards;

(d) if the secondary game trigger is selected and the wager is at least the designated wager amount, control said secondary game display device and said indicator for relative rotation, wherein the alignment of said indicator and secondary game display device identifies the selection of the award associated with the selected secondary game trigger; and (e) award the selected secondary game award to the player.

14. The gaming device of claim 13, which includes a separate display device operable with the processor to display the selection between the secondary game trigger or no trigger condition.

* * * * *

UNITED STATES PATENT AND TRADEMARK OFFICE

CERTIFICATE OF CORRECTION

PATENT NO. : 7,144,321 B2
APPLICATION NO. : 10/753906
DATED : December 5, 2006
INVENTOR(S) : Jason M. Mayeroff It is certified that error appears in the above-identified patent and that said Letters Patent is hereby corrected as shown below:

In column 1, line 55, change “that by providing” to --that providing--.

In Claim 1, column 8, line 55, change “player the a primary” to --player the primary--.

Signed and Sealed this

Twenty-first Day of August, 2007

JON W. DUDAS

*Director of the United States Patent and Trademark Office*